United States Patent
Lang et al.

(10) Patent No.: US 6,786,509 B2
(45) Date of Patent: Sep. 7, 2004

(54) VEHICLE SUSPENSION WITH A DOCK HEIGHT HOLDING DEVICE

(75) Inventors: Kenneth G. Lang, Davison, MI (US); Steven R. Miller, Clarkston, MI (US); James Eckelberry, Canton, OH (US); Richard M. Clisch, Canton, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 140 days.

(21) Appl. No.: 09/992,496

(22) Filed: Nov. 6, 2001

(65) Prior Publication Data

US 2003/0085536 A1 May 8, 2003

(51) Int. Cl.[7] ............................................. B60G 17/005
(52) U.S. Cl. ............. 280/754; 280/6.151; 280/124.158; 267/24.12; 267/122; 267/218
(58) Field of Search .......................... 280/6.151, 6.153, 280/124.158, 754, 755; 267/64.12, 122, 218; 188/269

(56) References Cited

U.S. PATENT DOCUMENTS 2,893,104 A * 7/1959 Hancock ..................... 267/256
3,246,925 A * 4/1966 Morgan ..................... 296/97.6

FOREIGN PATENT DOCUMENTS

| DE | 3934821 A1 | * | 4/1991 |
| DE | 19539151 A1 | * | 4/1997 |
| DE | 19806499 A1 | * | 8/1999 |
| DE | 19858259 A1 | * | 8/1999 |
| EP | 0 554 573 A2 | * | 8/1993 |
| FR | 2686551 A1 | * | 7/1993 |
| WO | WO 00/53442 A1 | * | 9/2000 |

OTHER PUBLICATIONS

PTO 04–0442 translation of DE 198 06 499 A1.*
PTO 04–0041 translation of DE 198 58 259 A1.*

* cited by examiner

Primary Examiner—Ruth Ilan
(74) Attorney, Agent, or Firm—Carlson, Gaskey & Olds

(57) ABSTRACT

A vehicle suspension assembly includes a height holding device that is at least partially supported within an air spring of the suspension assembly. The height holding device includes a hydraulic ram. A moveable portion of the hydraulic ram moves between a first position where a minimum clearance is maintained between suspension components and a second position where a larger clearance is maintained between the suspension components. The height holding device moves into the second position to maintain a desired height of the truck or trailer bed during loading and unloading operations at a loading dock, for example. The height holding device allows for the suspension air springs to be evacuated of air pressure during loading or unloading conditions without a change in deck height.

21 Claims, 3 Drawing Sheets

VEHICLE SUSPENSION WITH A DOCK HEIGHT HOLDING DEVICE

BACKGROUND OF THE INVENTION

This invention generally relates to vehicle suspensions. More particularly, this invention relates to an arrangement for maintaining a desired dock height of a vehicle under selected conditions.

Vehicle suspensions are well known. Many arrangements for trucks or other heavy vehicles include air-based suspension components commonly known as air springs. Typical arrangements include a dump valve to exhaust air from the air springs when vehicle parking brakes are applied. As air is evacuated from the air springs, the height of the trailer or rear end of the truck (depending on the vehicle configuration) typically drops from a ride height until an appropriate suspension component rests on a jounce bumper internal to the air springs. It is desirable to exhaust the air from the air springs to provide a stable trailer deck for safely loading and unloading cargo from the trailer or truck.

A difficulty associated with conventional arrangements is that when the trailer or rear end of the truck drops as air is exhausted from the air springs, there is an undesirable mismatch between the trailer deck height and the loading dock height. Under some circumstances, a mismatch between the trailer deck height and the dock height prevents a forklift or other vehicle from moving into and out of the trailer for transferring the cargo.

One proposed solution has been to include a non-dump height control valve such that air is not evacuated from the air springs when parking brakes are applied This solution is not ideal, however. In many instances, attempting to load or unload a trailer without first exhausting air from the air springs results in undesirable bouncing and creates a possible safety concern. It is best to have the truck or trailer as stable as possible during loading or unloading operations.

Accordingly, there is a need for a safe and stable arrangement that allows loading and unloading a trailer while maintaining a desired height of the deck of the truck or trailer. This invention addresses that need and avoids the shortcomings and drawbacks of prior attempts.

SUMMARY OF THE INVENTION

In general terms, this invention is a vehicle suspension assembly having a dock height holding device. An assembly designed according to this invention includes a first support member attached to a body of the vehicle. A second support member moves relative to the first support member. At least one air spring is coupled with the first and second support members to provide load transfer and relative movement between them. A height holding device is positioned within the air spring and supported on one of the support members. The height holding device has a moveable portion that is moveable from a first position where the moveable portion permits relative movement between the support members (such as during normal driving conditions) into a second position where the moveable portion prevents relative movement between the support members (such as during loading or unloading).

The height holding device preferably includes a hydraulic ram that is moved into a position to maintain a desired height of a trailer deck or truck bed, for example.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
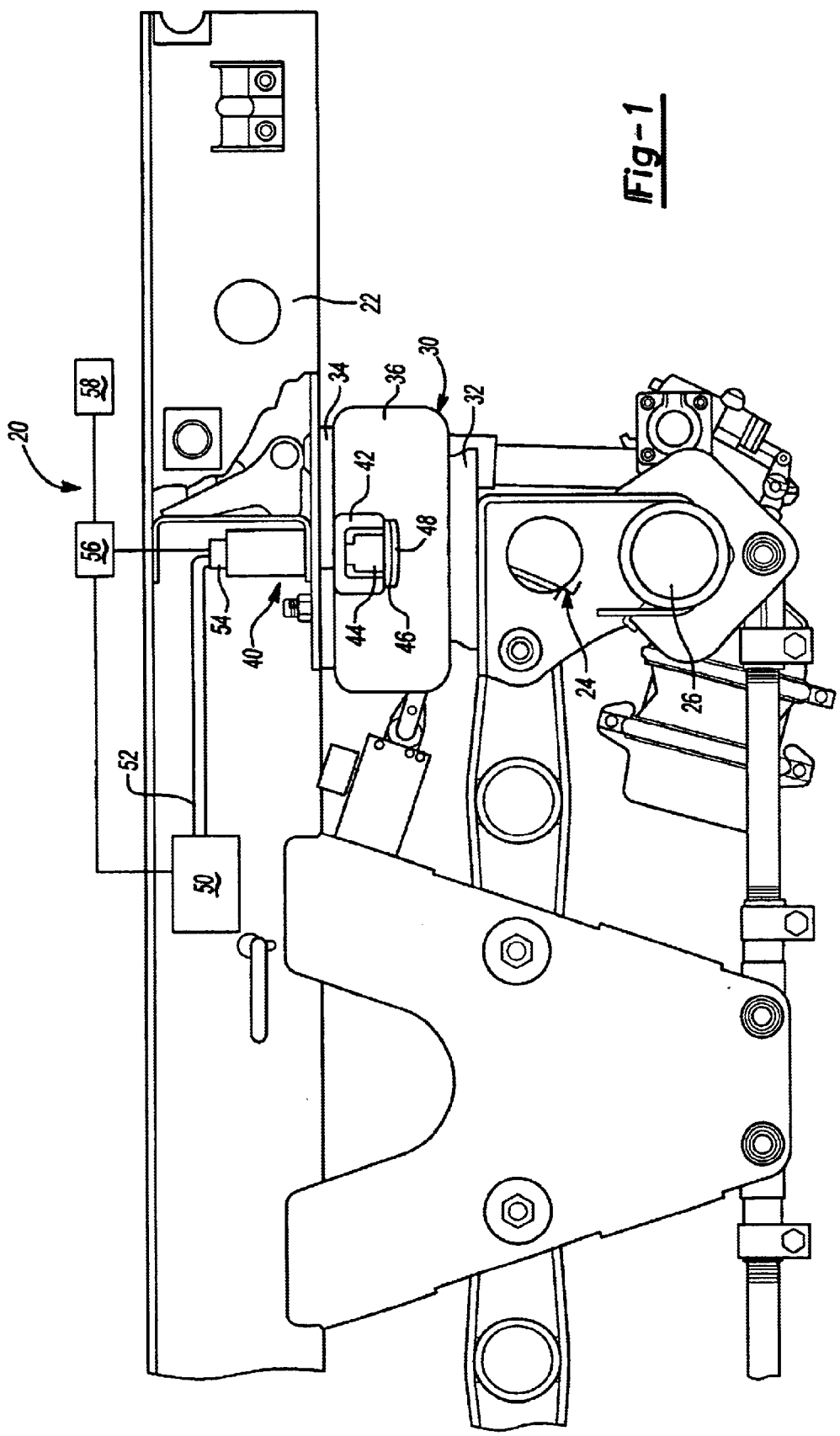
FIG. 1 schematically illustrates selected portions of a vehicle suspension assembly designed according to this invention.

A vehicle suspension assembly 20 is particularly useful for heavy vehicles such as truck and trailer arrangements. The illustrated example is especially useful for truck trailers that are used in carrying a variety of cargo.

The suspension assembly 20 includes a first support member 22 that is supported on the vehicle body in a conventional fashion. The first support member 22 can be referred to as part of the sprung mass of the vehicle. A second support member 24 is supported to move relative to the first support member 22. The second support member 24 is associated with a vehicle axle 26 and can be considered part of the unsprung mass of the suspension arrangement.

An air spring 30 is positioned between the first support member 22 and the second support member 24 to provide load transfer during relative movement between the support portions as the vehicle travels along a road surface, for example. The air spring 30 includes a retainer plate 32 that is supported for movement with the second support member 24. An upper bead plate 34 is supported to remain stationary relative to the first support member 22. A bellows portion 36 extends between the retainer plate 32 and upper beat plate 34 and is filled with air in a conventional fashion. Adjusting the air pressure within the bellows 36 adjusts the amount of load carrying capacity provided by the air spring 30.

A height holding device 40 is at least partially supported within the bellows 36. The height holding device 40 preferably includes a hydraulic ram having a stationary portion 42 and a moveable portion 44. A support plate 46 is associated with the moveable portion 44 and supports a jounce bumper element 48.

The moveable portion 44 preferably is moved relative to the stationary portion 42 using hydraulic pressure. A pressure source 50 provides pressure through a conduit 52 and an inlet port 54. The inlet port 54 preferably is controlled by a controller 56 to selectively control the amount of pressure provided to the hydraulic ram. The controller 56 preferably communicates with the pressure source 50 and a vehicle parking brake device 58. The controller 56 preferably controls the supply of pressure to the hydraulic ram responsive to actuation of the parking brake.

Figure 2:
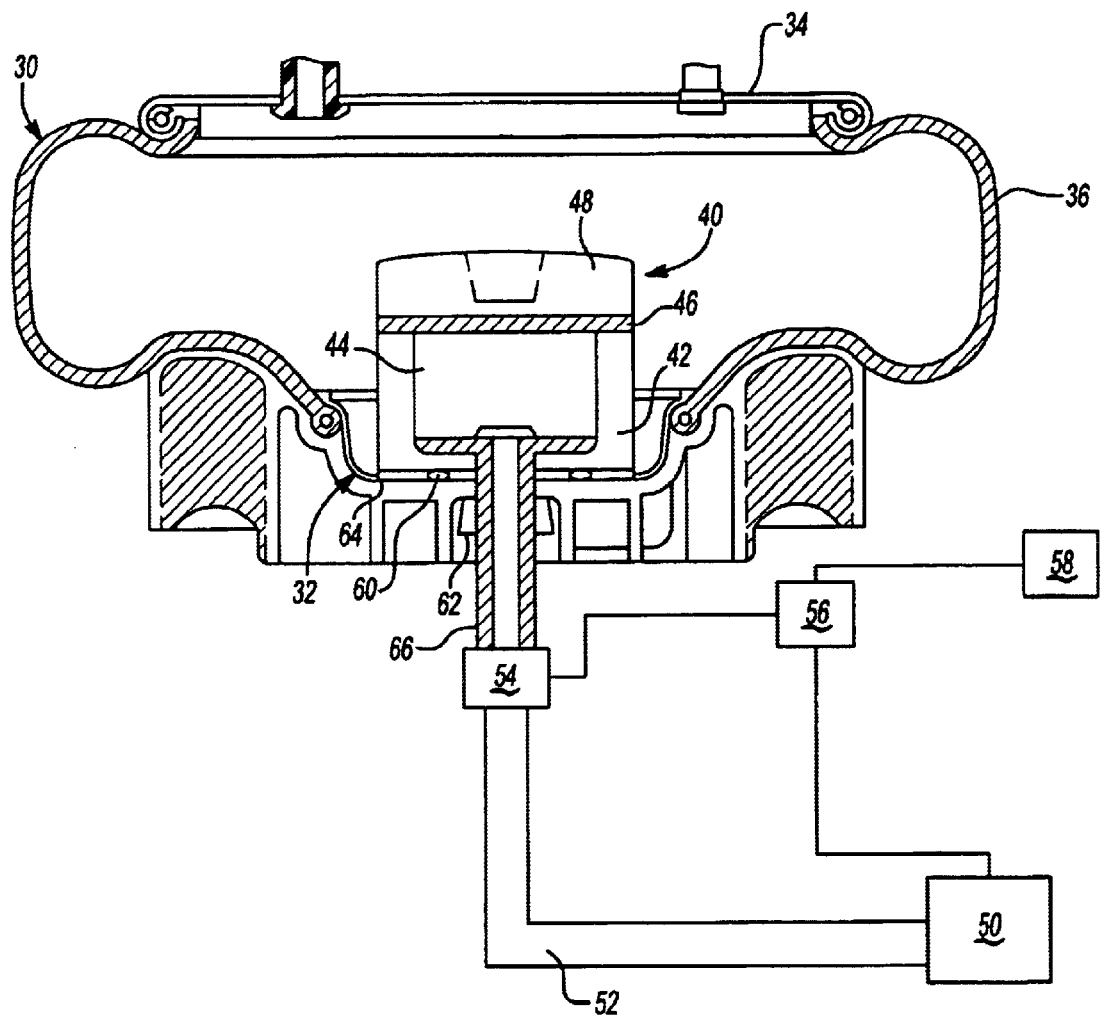
FIG. 2 illustrates, in somewhat more detail, selected portions of another example suspension assembly designed according to this invention.
Figure 3:
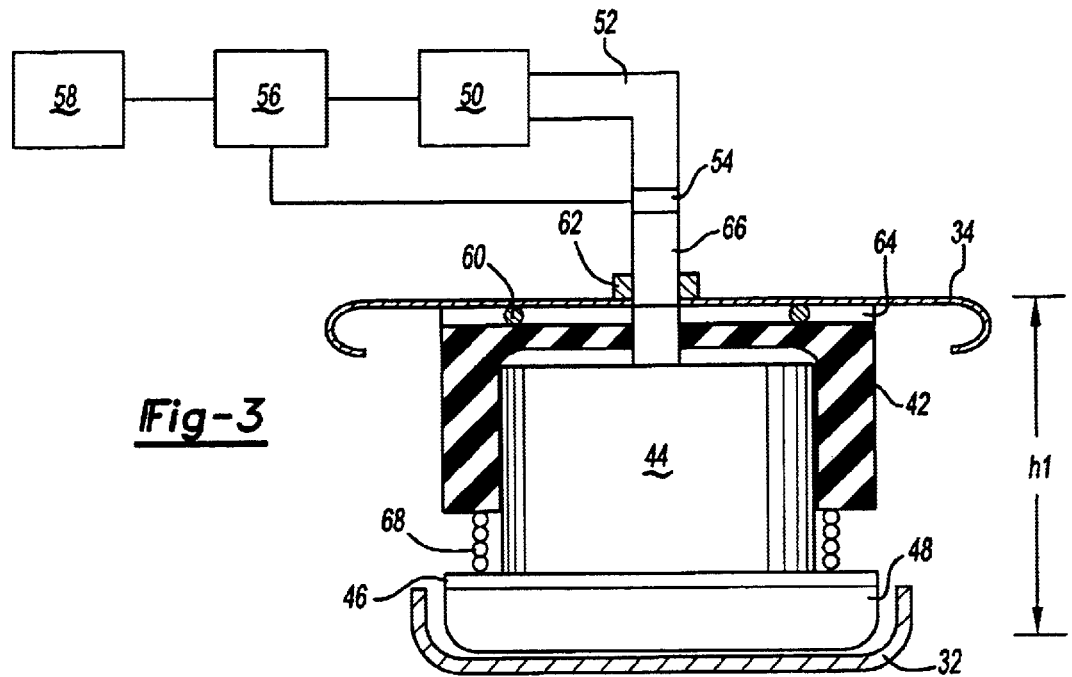
FIG. 3 schematically illustrates portions of the embodiment of FIG. 1 in a first operating condition.
Figure 4:
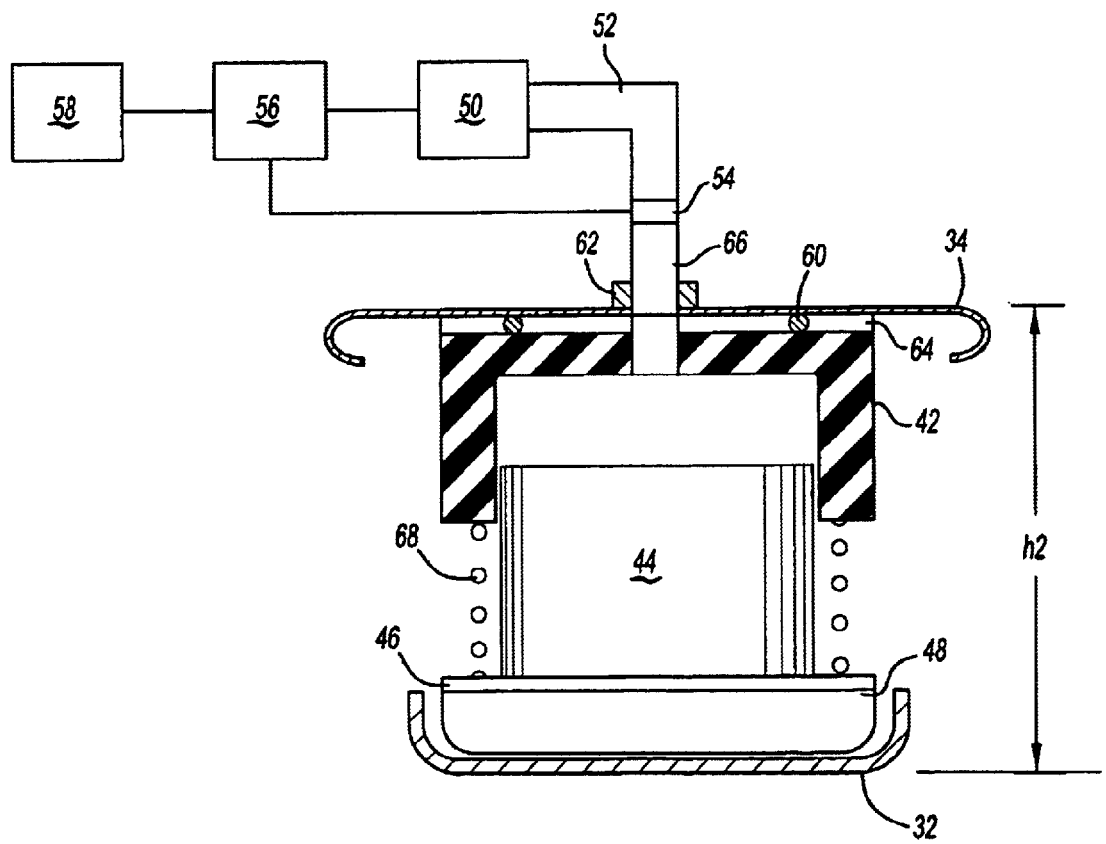
FIG. 4 illustrates the components of FIG. 3 in a second operating condition.

It is possible to mount the hydraulic ram onto the retainer plate 32 such as shown in FIG. 2 or onto the upper bead plate 34 such as shown in FIG. 1. Mounting the device 40 to be supported by the bead plate 34 and the support member 22 is preferred. In this position, the device 40 is part of the sprung mass of the vehicle. Those skilled in the art who have the benefit of this description will be able to choose the appropriate position based upon the particular vehicle configuration to which they are applying this invention. In the example of FIGS. 1, 3 and 4, the hydraulic ram is secured to the bead plate 34. In the example of FIG. 2, the hydraulic ram is secured to the retainer plate 32.

A first seal 60 and a second seal 62 preferably are provided to prevent air pressure from escaping from the bellows during normal suspension driving conditions. In one example, a filet weld is used at 64 to seal the interface between the stationary portion 42 and the associated component within the air spring 30.

A shaft 66 preferably extends at least partially outside of the air spring. The shaft 66 not only provides a mounting stud for the hydraulic ram assembly but also includes a central bore that acts as a hydraulic port for supplying pressure for the hydraulic ram operation.

During normal driving conditions, the moveable portion 44 preferably is in a first, retracted position relative to the stationary portion 42 (see FIG. 3). The moveable portion 44 preferably is biased into this first position by a biasing member. The illustrated example includes a spring 68 that urges the moveable portion 44 into the first, retracted position.

In the first position, the jounce bumper 48 and the opposing plate of the air spring assembly are typically spaced apart because of the air pressure within the bellows 36. Under certain driving conditions or when the air pressure is released, contact will be made between the jounce bumper 48 and the corresponding oppositely facing portion of the air spring assembly (i.e., the retainer plate 32 in FIGS. 3 and 4). Accordingly, a minimum spacing $h_1$ is maintained between the upper bead plate 34 and the retainer plate 32 regardless of the amount of pressure supplied to the bellows 36. In other words, the jounce bumper portion 48 will contact the retainer plate 32 under certain conditions and the dimensions of the hydraulic ram and the jounce bumper portion 48 ensure a minimum clearance $h_1$. This corresponds to a minimum clearance between the first support member 22 and second support member 24 of the suspension assembly.

Under certain conditions, such as when a vehicle is parked at a loading dock, it is desirable to maintain a ride height of the truck or trailer bed. The controller 56 preferably determines when the parking brake assembly 58 has been activated The controller 56 preferably then controls the operation of the inlet port 54 and the pressure supply 50 to apply hydraulic pressure to the ram 40. The moveable portion 44 responsively moves outwardly away from the stationary portion 42 into a second position where the jounce bumper 48 contacts the retainer plate 32. In one example, a total travel of about three inches will be normal.

The amount of pressure applied to the hydraulic ram preferably is enough to cause the moveable portion 44 to move into the contact position as schematically illustrated in FIG. 4. It is preferred not to apply any additional pressure to attempt to cause any separation between the upper bead plate 34 and the retainer plate 32, which would cause a corresponding rise in the height of the truck or trailer bed. The preferred arrangement includes applying only enough pressure to make contact and then to maintain the height or clearance $h_2$, which corresponds to the ride height of the truck or trailer bed.

The controller 56 preferably controls the port 54 so that the hydraulic ram is locked into a position corresponding to the desired height of the truck or trailer bed during loading and unloading. Once the hydraulic ram is in position, the air pressure from the bellows 36 may be evacuated without any concern of the truck or trailer bed dropping from the ride height, which is desired to permit loading and unloading of the truck or trailer cargo.

Once the controller 56 determines that the vehicle operator wishes to drive the vehicle again, such as by determining that the parking braked has been released, then the port 54 is controlled to release pressure from the hydraulic ram so that the moveable portion 44 is retracted back into the first position. In the illustrated example, the spring 68 draws the moveable portion 44 back into the first position.

The signals received by the controller 56 may be pressure signals or electrical signals depending on the configuration of the particular vehicle brake assembly. Because many vehicles include a spring applied, air release parking brake assembly, air signals are preferred. Those skilled in the art who have the benefit of this description will be able to choose the appropriate components to realize the necessary control of the height holding device designed according to this invention to meet the needs of a particular situation.

A vehicle suspension assembly designed according to this invention takes advantage of existing vehicle components and incorporates a unique deck height holding device that easily fits within current vehicle packaging constraints.

The preceding description is exemplary rather than limiting in nature. Variations and modifications to the disclosed examples may become apparent to those skilled in the art that do not necessarily depart from the essence of this invention. The scope of legal protection given to this invention can only be determined by studying

We claim:

1. A vehicle suspension assembly, comprising:
   a first support member attachable to a body of the vehicle;
   a second support member that moves relative to the first support member;
   at least one air spring coupled with the first and second support members;
   a height holding device at least partially within the air spring and supported on one of the first and second support members, the height holding device having a moveable portion that is moveable from a first retracted position where the moveable portion permits relative movement between the first and second support members into a second extended position where the moveable portion maintains a desired spacing between the first and second support members;
   a biasing member that biases the moveable portion into the first retracted position;
   a hydraulic ram that moves the moveable portion against the bias of the biasing member, the moveable portion comprising a piston portion of the hydraulic ram; and
   an inlet port associated with the hydraulic ram that selectively locks the hydraulic ram such that pressure within the hydraulic ram provides the only maintaining force to maintain the moveable portion in the second extended position.

2. The assembly of claim 1, including an actuator that controls the inlet port to thereby control movement of the piston portion.

3. The assembly of claim 2, wherein the actuator moves the piston portion into the second extended position responsive to an application of the vehicle parking brake.

4. The assembly of claim 1, wherein the moveable portion is moved with a force that is too small to cause an increase in a spacing between the first and second support members.

5. The assembly of claim 1, including a bead plate within the air spring that is associated with the first support member and a retainer plate that is associated with the second support member and wherein the height holding device is at least partially supported on one of the retainer plate or the bead plate.

6. The assembly of claim 5, wherein the height holding device is supported on the bead plate.

7. The assembly of claim 5, including a bumper member supported on an end of the moveable portion that contacts the other of the bead plate or the retainer plate when the moveable portion moves into a position to maintain the desired spacing between the first and second support members.

8. The assembly of claim 1, wherein the biasing member comprises a spring.

9. The assembly of claim 1, including
a controller that determines when air pressure from within the air spring will be evacuated and the controller causes the moveable portion to move into the second extended position to maintain a current spacing between the first and second support members before the air spring pressure is evacuated.

10. An air spring assembly for use in a vehicle suspension system, comprising:
a bead plate supported on a portion of the suspension system that remains stationary relative to the vehicle body;
a retainer plate supported on a portion of the suspension system that is moveable relative to the stationary portion;
a bellows that extends between the bead plate and the retainer plate, the bellows containing a selected air pressure to provide a desired amount of damping of movement of the moveable suspension portion relative to the stationary portion;
a height holding device at least partially within the bellows and at least partially supported on one of the bead plate or the retainer plate, the height holding device having a moveable portion that is moveable from a first retracted position where there is clearance between the moveable portion and the other of the bead plate or the retainer plate and a second extended position where the moveable portion contacts the other of the bead plate or the retainer plate;
a biasing member that biases the moveable portion into the first retracted position;
a hydraulic ram that moves the moveable portion against the bias of the biasing member into the second extended position; and
an inlet port associated with the hydraulic ram that selectively locks the hydraulic ram such that pressure within the hydraulic ram provides the only maintaining force to maintain the moveable portion in the second extended position.

11. The assembly of claim 10, wherein the height holding device is at least partially supported on the bead plate.

12. The assembly of claim 10, wherein the moveable portion comprises a piston portion of the hydraulic ram.

13. The assembly of claim 12, including an actuator that controls the inlet port to thereby control movement of the piston portion.

14. The assembly of claim 13, wherein the actuator is operative to move the piston portion into the second extended position responsive to an application of the vehicle parking brake.

15. The assembly of claim 10, including a bumper member supported on an end of the moveable portion that contacts the other of the bead plate or the retainer plate when the moveable portion moves into the second extended position.

16. The assembly of claim 1, wherein the height holding device includes a stationary portion that is received within the air spring and the moveable portion is moveable relative to the stationary portion and including at least one seal between the stationary portion and an associated portion of the air spring, the seal preventing air from exiting the air spring.

17. The assembly of claim 16, including a shaft portion of the hydraulic ram outside of the air spring and a second seal at an interface between the shaft portion and an associated portion of the air spring, the second seal preventing air from exiting the air spring.

18. The assembly of claim 16, wherein the stationary portion is welded to the associated portion of the air spring.

19. The assembly of claim 10 wherein the height holding device includes a stationary portion that is received within the air spring and the moveable portion is moveable relative to the stationary portion and including at least one seal between the stationary portion and an associated portion of the air spring, the seal preventing air from exiting the air spring.

20. The assembly of claim 19, including a shaft portion of the hydraulic ram outside of the air spring and a second seal at an interface between the shaft portion and an associated portion of the air spring, the second seal preventing air from exiting the air spring.

21. The assembly of claim 19, wherein the stationary portion is welded to the associated portion of the air spring.

* * * * *